Patented Aug. 23, 1938

2,127,770

UNITED STATES PATENT OFFICE 2,127,770

PRINTING PASTE THICKENER

Erhart Franz, Leipzig, and Max Hardtmann, Naunhof, near Leipzig, Germany

No Drawing. Application July 28, 1934, Serial No. 737,466

8 Claims. (Cl. 8—6)

This invention relates to the production of a nonadhesive thickening composition or substance.

Thickening agents are used for various purposes, e. g., as additions in the preparation of pastes for printing fibers, fibrous material, wood and the like, and comprised hitherto chiefly solutions of starch, pectin, gum, glue, gelatin, slime and dextrin as well as glycerine and solutions of organic or inorganic salts. Thickening agents of this kind suffer, however, from the drawback that they are soluble in water, so that printing pastes containing them will readily disperse and yield impressions with unsharp outlines, and, furthermore, with the exception of the salt solutions, are highly adhesive with the result that, when textiles are printed for instance, the fibers thereof will stick together and thus render further treatment considerably difficult. The salt solutions, on the other hand, are not very useful for the reason that all organic and inorganic materials are more or less sensitive to salt and the products of hydrolysis of these salts injure the fibers and fabrics to a considerable degree.

It has been proposed to employ fatty oils as thickening agents for, say, printing pastes, but it was found that the removal of the oil required complicated methods in the application of which the coloring matter and the filling material if added were usually eliminated also.

According to the invention, the defects mentioned are avoided by providing thickening agents which are prepared by mixing a hydrophilic substance that is insoluble or very slightly soluble in water with a hydrophilic water soluble substance which has an emulsifying effect and holds the substance insoluble in water in emulsion as soon as water is added. In this way it becomes possible, even in the presence of much water, to obtain a stiff thickening and thus a stiff printing paste, and also to wash such pastes easily out of the material, either completely or partially, as required. The coloring matter may be fixed on the material and the thickening agent washed out without causing losses of material due to adhesion. Hydrophile substances insoluble in water and possessing considerable thickening power are particularly such aliphatic or cycloaliphatic compounds which contain at least one hydroxyl group in the molecule. In so far as they have a low molecular weight, such compounds are soluble in water, but lose their water solubility, though remaining hydrophile, at a higher molecular weight. We mention in this respect the aliphatic alcohols having at least 8 carbon atoms, such as decyl alcohol, dodecyl alcohol, tetradecyl alcohol, hexadecyl alcohol, octadecyl alcohol, octa decenyl alcohol; suitable are also dodecoylaminoethanol, tetradecoylglycerine, oleoyltriethanolamine, hexadecylethanolamine, tetradecylsulfodioxypropanamide. For forming an emulsion and thus insuring high water absorption and carrying capacity for the substances that are insoluble in water the salts of aliphatic and cycloaliphatic acids having at least 8 carbon atoms are particularly suited, especially the alkalies, the ammonium and organic basic salts of the carboxylic acids, i. e., fatty acids, such as lauric acid, palmitic acid, stearic acid and oleic acid, and, further, the corresponding sulfo acids, including the aromatic, such as di-isobutylnaphthalenesulfonates. There are further the salts of the alcohol sulfuric acids having more than 8 carbon atoms, which include, among others, sodium octadecylsulfonate, sodium octadecyldisulfonate, sodium dodecylsulfate, ammonium tetradecylsulfate, triethanolamine hexadecylsulfate, sodium oleoylmethylaminoethanesulfonate, potassium decylsulfamidoethanesulfonate, sodium propanesulfamidoethanesulfonate, and sodium octadecylthiosulfate.

As emulsions of this class, such as of ethal (commercial cetyl alcohol) and soap, are capable of holding large amounts of organic hydrophobe substance insoluble in water in emulsion or suspension, they may advantageously be added, e. g., paraffin, Montan wax, mineral oil, Japan wax and the like, without the least fear that they will not be removable again or interfere with, or prevent, the further treatment of the material if permitted to remain therein. Besides being good thickening agents, such mixtures if applied to organic material will increase the hydrophily thereof, that is, a fiber treated with such compounds will contain and retain more water than an untreated one, so that thickening agents of this kind may advantageously be employed for the purpose of increasing hydrophily and thus facilitating the workability of material. If hydrophobic material possessing good slip-producing properties like paraffin or mineral oil, etc. is added, not only the sliding power thereof will act, but the hydrophily produced by the higher molecular alcohols will enhance this sliding effect by a supplementary sliding effect which may be called slipperiness and which depends upon the presence of water. Increased hydrophily will facilitate combing and hackling as well as spinning, weaving, knitting, plaiting, etc. Thickening agents of this type may therefore be used with excellent success as mill oils or softeners. In case of spinning, the otherwise required moistening of the premises can be either dispensed with or reduced to a considerable extent, so that the troublesome rusting of the machine is prevented. This is particularly important in the working of artificial silk, which requires that the single fibers, besides possessing great slipperiness, show some body or strength. This requirement can be readily complied with by employing thickening agents of the kind mentioned. The hydrophily of the thickening substance will facilitate the mechanical working of the material without injuring the latter and without, in particular, reducing the tensile strength thereof, so that the lower strength of artificial silk when wet does not become apparent during the application of the thickening agents described.

As stated, the thickeners can be readily removed again from the material, and it was found that it is even not necessary to remove them, as their high hydrophily permits further treatment, such as dyeing, without any trouble. The thickening agents can thus be used also for finishing, i. e., for loading or otherwise improving the material, such as textile fibers or the like. Weighting matter for imparting to the material a fuller feel, are used especially for silk, and it is generally known that weighted silk will soon become brittle. When thickening agents of the class described are added, this trouble is prevented almost completely Finishing is intended to impart to lighter fabrics, such as linen or cotton, a certain body without adhesiveness if possible and, above all, without producing hardening and a poor feel. These objects can be attained by the thickening agents mentioned. Improvements may further be effected by imparting to a naturally hard material a flexible feel by increasing the water absorptivity thereof, which can also be effected by means of the thickeners described. The high carrying capacity of such emulsions with respect to insoluble compounds makes it further possible to apply, with their aid, to the material concerned agents that are insoluble in water and capable of preventing attacks by noxious animals and plants, such as the 2,2'-dioxy-dichlordiphenylmethane, 2-oxy-3,5x'-trichlordiphenylmethane, triphenylphosphine, tritolylstibine, tribenzyphosphineoxide, triphenylphosphine condensed with a chloracetyldichlorobenzene or chloracetone, triphenylphosphineoxide condensed with chlorthymol, salol, etc., though water soluble insecticides, fungicides, bactericides, etc. may be added also. The compounds described may further be used for thickening and preparing cosmetic creams, and are particularly suited for making tooth pastes, skin creams and ointments intended for application to mucous membranes, e. g., hemorrhoidal suppositories, salves for eyes and nose, etc.

The following mixtures have been found to be particularly effective:

*Example 1*

A paste suitable for Vigoreux printing is obtained by mixing, under constant stirring, 500 parts by weight of water having a temperature of 60° to 80° C. with 50 p. b. w. of cetyl alcohol (commercial ethal having a melting point of about 40° C.) and 5 p. b. w. of sodium stearylsulfonate (abt. 75%). 2 to 4 kg. of the paste produced is used for every 10 kg. printing mixture. An equally stiff and useful paste can be obtained from 500 p. b. w. of water, 30 p. b. w. Montan wax, white 30 p. b. w. of stearylalcohol and 10 p. b. w. of ammonium cetylsulfonate. Of this paste 1.5 to 3 kg. are added to every 10 kg. printing mixture. Montan wax may be replaced by soft paraffin or mineral oil, which will give the same satisfaction.

*Example 2*

A softener facilitating the workability of artificial silk fibers can be produced as follows: A stiff paste consisting of 11 parts by weight of paraffin having a melting point of 40° to 42°, 3.6 p. b. w. of mineral oil of the commercial kind and of a flash point of 140°, 2 p. b. w. of dodecylalcohol and 0.6 p. b. w. of sodium laurylsulfate is liquefied by heating and mixing with 3 p. b. w. ethylalcohol and 9 p. b. w. of trichlorethylene so as to be applicable to the material by brushing, dripping or spraying. Artificial silk thus treated produces 50% or less noil than untreated material or material treated with highly sulfonated oils.

*Example 3*

If 5 parts by weight of hexadecanol are heated to 40° to 50° C. and added to 10 to 15 p. b. w. of water having the same temperature and previously mixed with 0.5 p. b. w. of sodium dodecylsulfate, whereupon a corresponding amount of aromatic substance is added to the solution, a good stiff skin cream will be produced after stirring and cooling, which is particularly distinguished by containing no greasy constituents.

*Example 4*

Add to a solution of 15 parts by weight of sodium dodecylsulfate in 1000 p. b. w. of water of 40° to 60° C. 360 p. b. w. of paraffin having a melting point of 40° C. and 48 p. b. w. of hexadecanol having a melting point of 38° to 40° C., the two last-mentioned substances having previously been liquefied by heating them to about 50° C. Stir and allow to cool. The resulting product is a thickly liquid or stiff paste which after adding thereto about 800 p. b. w. of water and about 50 p. b. w. of triphenyl-dichlorbenzyl-phosphoniumchloride can be used with excellent success for softening woolen material. The material thus treated will show about 25% less thread breakage during spinning and will be avoided by noxious animals and plants.

*Example 5*

By heating a solution of 1 part by weight sodium dodecylsulfate in 100 parts by weight water and 10 p. b. w. hexadecanol having a melting point of about 40° C. to 50°–60° C. and stirring the mixture until it is cold a paste ranging from viscosity to a state that permits cutting will be produced which can be successfully used for finishing fabrics by applying it by means of a spreading machine. Goods thus treated obtain a full soft feel and do not show the defects produced by other finishing agents, e. g., lack of creasing capacity, etc.

We claim:—

1. A printing paste having as, a nonadhesive non-alkaline thickener a polar hydrophile alcohol containing at least 8 carbon atoms insoluble in water and a solution of an emulsifying water soluble hydrophile salt of an aliphatic sulfo acid containing at least 8 carbon atoms in the aliphatic nucleus in water.

2. A printing paste having as, a nonadhesive non-alkaline thickener a polar hydrophile alcohol containing at least 8 carbon atoms insoluble in water, a water solution of an emulsifying water soluble hydrophile salt of an aliphatic sulfo acid containing at least 8 carbon atoms in the aliphatic nucleus, and a hydrophobe thickening agent.

3. A printing paste having as, a nonadhesive non-alkaline thickener a polar hydrophile alcohol containing at least 8 carbon atoms insoluble in water and sodium dodecylsulfate as emulsifying salt dissolved in water.

4. A printing paste having as, a nonadhesive thickener a polar hydrophile alcohol containing at least 8 carbon atoms insoluble in water and as emulsifying salt the ammonium salt of the tetradecylsulfo acid dissolved in water.

5. A printing paste having as, a nonadhesive thickener a polar hydrophile alcohol containing at least 8 carbon atoms insoluble in water and sodium octadecenoylmethylaminoethane sulfonate dissolved in water.

6. A printing paste having as, a nonadhesive non-alkaline thickener hexadecanol and a water solution of an emulsifying water soluble hydrophile salt of an aliphatic sulfo acid containing at least 8 carbon atoms in the aliphatic nucleus.

7. A printing paste having as, a nonadhesive thickener hexadecanol and paraffin and sodium dodecylsulfate dissolved in water.

8. A printing paste for wool having, a nonadhesive thickener, comprising hexadecanol and sodium octadecenoylmethylaminoethane sulfonate in water.

ERHART FRANZ.
MAX HARDTMANN.